United States Patent Office 2,844,406
Patented July 22, 1958

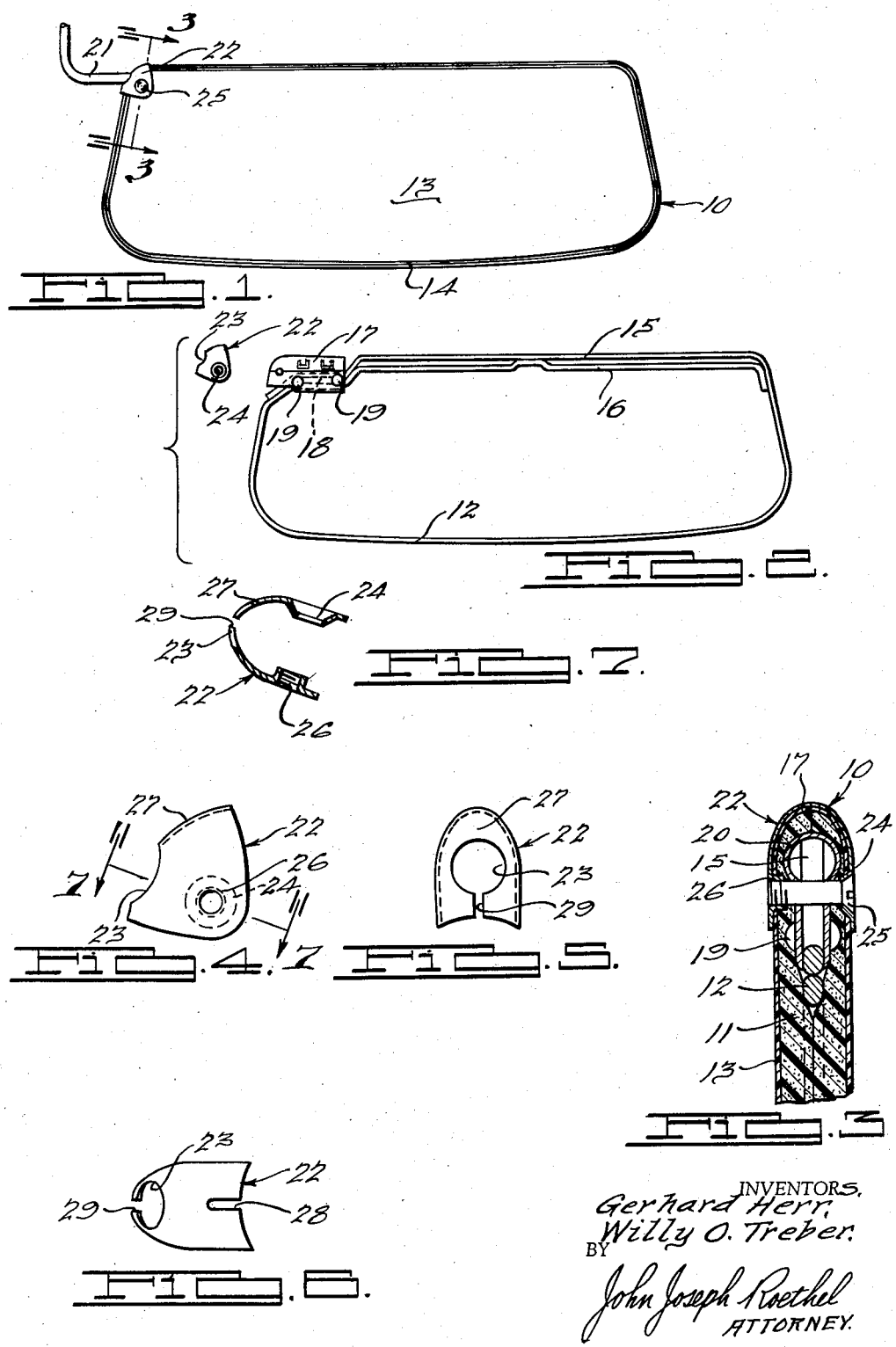

2,844,406

SUN VISOR MOUNTING MEANS

Gerhard Herr, Wuppertal-Vohwinkel, and Willy O. Treber, Wuppertal-Elberfeld, Germany, assignors to Gebruder Happich-G. m. b. H., Wuppertal-Elberfeld, Germany Application December 17, 1956, Serial No. 628,829

Claims priority, application West Germany August 24, 1956

2 Claims. (Cl. 296—97)

This invention relates to vehicular sun visors. More particularly, the present invention relates to an improved clamp structure utilized in mounting the sun visor to a supporting bracket arm adjacent the upper portion of the vehicle windshield.

One known type of sun visor comprises a resilient padding member having a form maintaining resilient frame member associated therewith, said frame member and padding member being covered by a suitable foil material. This type of sun visor has the dual function of acting as a sun shield and as a protective crash pad in the event that the vehicle is involved in a collision. Generally, such a vehicle sun visor is suspended from the windshield frame or the vehicle ceiling on a swivelly mounted support arm, the latter being pivotal about a vertical axis and being provided with a horizontally extending free end portion. The sun visor is provided with a clamp device into which the free end of the support arm projects thereby providing a horizontal axis about which the sun visor is swingable from a position parallel to the plane of the windshield to a position parallel to the plane of the vehicle compartment ceiling. Generally, the clamp device is positioned at one corner of the sun visor in such a manner that the entire clamp device is exposed to view. To improve the appearance of the clamp device, it is necessary to provide the exposed portions of the clamp device with a suitable finish, such as nickel plate or chrome plate. Because of the size and intricate shape of the clamp device, the cost of the plating and buffing operations involved is relatively expensive. Furthermore, the assembly of the clamp device is a relatively intricate and time consuming operation inasmuch as the foil comprising the sun visor outer covering must be neatly fastened without being creased or folded in the process.

It is an object of the present invention to provide a clamp device which is of simplified construction, easy to assemble and which has a low cost of fabrication. It is a further object to provide a clamp device the major portion of which is concealed from view by the outer covering of the sun visor, the opening for the support arm being marked by a finished plain cap of small area.

In the exemplary embodiment of the invention herein described, a clamp device is directly mounted on the resilient frame member of the visor, the clamp being covered by the edge welded foil material comprising the visor outer covering. The opening of the support arm receiving cavity in the clamp device is covered by an apertured cap placed on the outside of the visor walls, suitable fastening means for the cap projecting through the clamp device. Because the required cap is of relatively small size and of simple contour, the cost of fabrication and plating is considerably reduced. Further, only a small portion of the visor covering material underlines the cap thereby greatly minimizing the creation of undesired creases and folds.

Other features, objects and advantages of the present invention will be apparent from the following description and appended claims, reference being had to the accompanying drawing forming a part of this specification wherein like reference numerals designate corresponding parts in the several views.

Fig. 1 illustrates a sun visor constructed in accordance with the principles of the present invention.

Fig. 2 represents the resilient frame utilized in the sun visor, a clamp element secured to one corner thereof and a cap associated with the clamp element to form the complete clamp device.

Fig. 3 is a sectional view taken substantially through line 3—3 of Fig. 1 looking in the direction of the arrows.

Fig. 4 is a side elevation of the cap device.

Fig. 5 is a front elevation of the cap device.

Fig. 6 is a plan view of the cap device.

Fig. 7 is a cross sectional view taken substantially through line 7—7 of Fig. 4 looking in the direction of the arrows.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to the drawing in detail, the exemplary sun visor 10 consists of a unit having substantially the contour of a conventional vehicular sun visor. The sun visor 10 comprises a padding member 11 (see Fig. 3), preferably made of a plastic foam material, and a resilient frame member 12 contained within the slotted periphery of the padding member 11 to maintain the form of the latter. The padding member 11 and the frame member 12 are covered by a suitable covering material 13, preferably a plastic foil, the peripheric edges 14 of which are adapted to be welded together.

It will be noted that the frame member 12 comprises a substantially rectangular wire loop, the upper horizontal portion of which comprises two overlying wire sections 15 and 16 which are welded together at convenient intervals to provide a reinforced support bridge. It will be further noted that the overlying wire sections at the upper left hand corner of the frame member 12 (as viewed in Fig. 2) are offset inwardly or below the upper edge of the frame member. The offset is provided to enable a clip or clamp device 17 to be secured to this corner of the frame member without affecting the general contour of the sun visor. The wire sections at the offset are spaced to provide a horizontally longitudinally extending slot 18 adapted to receive rivets 19 for securing the clamp device 17 on the frame.

The clamp device 17 is provided with a longitudinally extending rod receiving portion 20, the rod 21 being shown in Fig. 1. The horizontal portion of the rod 21 within the rod receiving portion 20 provides a bearing for the sun visor whereby the latter may be swung from a substantially vertically extending position, as shown in Fig. 1, to or beyond a substantially horizontally extending position. It will be understood that the vertically extending portion of the rod 21 is journalled for swivelling movement about a vertical axis in a conventional sun visor mounting bracket (not shown) adapted to be conveniently secured to an interior frame member of the vehicle.

The clamp device 17 is completely concealed from view by the outer covering material 13 of the sun visor except for the extreme corner thereof through which the rod 21 projects. To further improve the appearance and to provide a means for adjusting the clamping tension of the clamp device 17, an additional cap element 22 is provided. The cap element 22 is illustrated in detail in Figs. 4 to 7 inclusive.

The cap element 22 is preferably a metal stamping formed or cut in a sector so that the side walls 22 overlap the underlying corner of the visor. The cap element 22 is provided with an opening 23 adapted to receive the rod 21. One side wall of the cap is provided with a countersunk aperture 24 adapted to receive the head portion of a screw 25. The aperture 24 is in alignment with a second aperture 26 having an inwardly extending threaded wall portion adapted to be threadedly engaged by the screw 25.

The end or crown face 27 of the cap is provided with a pair of slots 28 and 29. The slots 28 and 29 lie on the longitudinal center of the cap. The slot 28 projects inwardly from the upper edge of the cap for a proportional distance substantially as shown in Fig. 6. The slot 29 extends upwardly and preferably opens into the aperture or opening 23.

As shown in Fig. 3, the cap 22 overlies the foil material covering the upper corner of the visor. The screw 25 serves to fix the cap in place and further provides a means for adjusting the clamping pressure of the clamp device 17 on the rod 21. By appropriately turning the screw so as to draw the cap sidewalls toward each other, the clamp element 17 is caused to grip the rod or support arm 21 with increased frictional engagement. The degree of frictional engagement may thus be controlled so that the visor will be retained in any required position while permitting easy regulation of its position.

We claim:

1. In combination with a sun visor adapted to be mounted on a support rod, said visor having a frame formed of a wire loop, the upper portion of said loop comprising two sections of wire which at one corner thereof are in spaced parallel relationship to each other, a padding member containing said frame within the peripheral edges thereof, and an outer covering housing said padding member and frame, a mounting device comprising a clamp member straddling said frame at said one corner thereof, means passing through the side walls of said clamp member and the spaced wire sections at said one corner of the frame securing said clamp member to said frame, said clamp member being substantially concealed within said outer covering, said clamp member being provided with a longitudinally extending support rod receiving portion, said outer covering being provided with an opening to permit insertion of a support rod within said portion, an apertured cap member mounted to cover said opening and to straddle a portion of said outer covering and the clamp member therebeneath, the cap aperture being in alignment with the support rod receiving portion of the clamp member, and means securing said cap member to said clamp member.

2. In combination with a sun visor adapted to be mounted on a support rod, said visor having a frame formed of a wire loop, the upper portion of said loop comprising two sections of wire which at one corner thereof are in spaced parallel relationship to each other, a padding member containing said frame within the peripheral edges thereof, and an outer covering housing said padding member and frame, a mounting device comprising a clamp member straddling said frame at said one corner thereof, means passing through the side walls of said clamp member and the spaced wire sections at said one corner of the frame securing said clamp member to said frame, said clamp member being substantially concealed within said outer covering, said clamp member being provided with a longitudinally extending support rod receiving portion, said outer covering being provided with an opening to permit insertion of a support rod within said portion, an apertured cap member mounted to cover said opening and to straddle a portion of said outer covering and the clamp member therebeneath, the cap aperture being in alignment with the support rod receiving portion of the clamp member, and means securing said cap member to said clamp member, said last mentioned means being adjustable to vary the pressure of the side walls of said cap member on said clamp member thereby to vary the gripping pressure of the latter on a support rod inserted therein.

References Cited in the file of this patent

UNITED STATES PATENTS

| 2,234,284 | Schoenheit | Mar. 11, 1941 |
| 2,424,500 | Peltier et al. | July 22, 1947 |
| 2,506,689 | Simpson et al. | May 9, 1950 |
| 2,560,009 | Straith | July 10, 1951 |
| 2,589,866 | Roberts | Mar. 18, 1952 |

FOREIGN PATENTS

| 1,123,335 | France | June 11, 1956 |